April 14, 1959  E. T. THIEM ET AL  2,881,836
BLANKING AND STACKING MACHINE
Filed Sept. 13, 1955  7 Sheets-Sheet 1

FIG. 1

INVENTORS:
EUGENE T. THIEM
LEO G. ZECHLIN
BY
Margall, Johnston, Cook & Root.
ATT'YS April 14, 1959 E. T. THIEM ET AL 2,881,836
BLANKING AND STACKING MACHINE
Filed Sept. 13, 1955 7 Sheets-Sheet 3

INVENTORS:
EUGENE T. THIEM
LEO G. ZECHLIN
BY
Marzall, Johnston, Cook & Root.
ATT'YS

April 14, 1959     E. T. THIEM ET AL     2,881,836
BLANKING AND STACKING MACHINE
Filed Sept. 13, 1955     7 Sheets-Sheet 4

INVENTORS:
EUGENE T. THIEM
LEO G. ZECHLIN
BY
Markall, Johnston, Cook & Root.
ATT'YS

United States Patent Office 2,881,836
Patented Apr. 14, 1959

2,881,836
BLANKING AND STACKING MACHINE

Eugene T. Thiem, Des Plaines, and Leo G. Zechlin, Chicago, Ill., assignors to Continental Can Company, Inc., New York, N.Y., a corporation of New York Application September 13, 1955, Serial No. 534,054

26 Claims. (Cl. 164—204)

This invention relates to a machine for forming blanks from a running web and stacking the blanks, and to a method therefor.

The invention comprises, in general, a device for printing an outline, design, symbol or character on a continuously moving web of material and then feeding the printed web between feed rolls to feed the web properly between a cutting roll and its cooperating backing or anvil roll. A line of cut is made in the web to define a blank which is held in suspension in the web until the blank is purposely and positively stripped out of the web along the line of cut. The cut web, with the blank in suspension, is then fed between lead rolls to a stripper roll or element for deliberately knocking out or stripping the cut blank from the web whereby there is provided continuous printing, continuous feeding, continuous cutting, continuous stripping, and continuous stacking of blanks. The suspended blanks are progressively stripped or pushed out from the web along the line of cut, and when stripped from the web are supported on the bottom edges thereof and arranged in a stacked position parallel to the continuously running web. The stripping element keeps the web taut at all times as a part of the stripper roll rotates at a peripheral or lineal speed somewhat greater than the lineal speed of the continuously moving web. An operable member is provided to prevent oncoming blanks from interfering in any way with the prior blanks which are arranged in stacked formation. Also, the stacked blanks are prevented from creeping or shifting toward the oncoming successive blanks, thereby providing room for a next blank to be positioned freely in place.

It is an important feature of the invention that the web be properly printed and then properly fed to a cutting roll, and that the cutting roll be of such proportion that the blank will stay within the confines of the web after a line of cut is formed in the web and the blank held in suspension in the web, whereafter the stripper pushes or strips the blank from the web. Means are provided to assist in pushing out the blank from the web as well as to assist in feeding the blank to a proper position to move the stripped blank into a horizontal plane relatively perpendicular to the moving web and then stacking the cut blanks in horizontal stacked relationship. Each blank is held in suspension in the web, and the stripper roll progressively urges the blank from the web perpendicular, or relatively so, to a line drawn vertical to the center line of the blank. The blank remains in contact with the cutter and its cooperating platen or anvil at the same time the blank is being engaged by the lead rolls. The stripper roll also does some of its knockout or stripping action while the blank is still being engaged by the lead rolls.

The primary object of the invention, therefore, consists in the provision of new and novel means, properly correlated, for effecting a printing operation, and then forming a line of cut in a constantly moving web to provide a blank which is retained within the confines of the line of cut and within the body of the web, whereupon a stripper, or knockout element, deliberately pushes the cut blank out of the web.

Another object of the invention consists in forming a line of cut in a continuously running or moving web of material to define a blank, and maintaining the blank in suspension in the web until being operated on by means for deliberately knocking out, or stripping, the blank from the moving web.

Another object consists in the provision of new and novel means for stripping a blank, normally held in suspension in a web, by progressively urging the blank out from the web.

Another object of the invention consists in pushing a blank from a line of cut in a constantly moving web to a position perpendicular to the position of the line of cut, and stacking successive blanks on their edges in a horizontal stack on a support.

A further object resides in the provision of new and improved means for maintaining a blank in suspension in a web after the blank has been cut by a cutter and anvil means, and urging the blank progressively out of the web at the same time the blank is being engaged by lead rolls.

A further object consists in the provision of a new and novel stripper member which progressively urges a cut blank from the running web as the blank is still engaged by the lead rolls.

Still another object of the invention resides in the provision of a combined printing, blanking and stacking mechanism whereby the printing, cutting and stripping rolls have definite operating speeds, and are of a diameter and speed which are proportional so that the number of pitches on a roll, the length of the pitch, and the diameter of the rolls are in proper proportion.

Another object of the invention consists in the provision of means for continuously cutting successive lines of cut from a continuously running web to form blanks suspended in the web, and then causing the successive blanks to be forced out of the web progressively by stripper means.

Still another object consists in the provision of continuously operating means to feed a web continuously, continuously stripping each blank successively from the running web progressively, and then stacking each successive stripped blank in a predetermined position and at a predetermined location.

A further object consists in the provision of a new and improved method for continuously printing, feeding, cutting, blanking and stacking blanks from a continuously moving web and then stacking the severed, knocked out or stripped cut blanks from the continuously moving web, the blanks being stripped out of the web, and then finally arranging the blanks in stacked formation in a relatively horizontal plane with certain edges of the blanks engaging a support.

A still further object resides in providing a device for engaging successive blanks to urge the blanks outwardly so as to provide sufficient space for successive blanks and at the same time prevent prior stacked blanks from moving or shifting reversely toward the web.

Numerous other objects and advantages will be apparent throughout the progress of the specification which is to follow.

The accompanying drawings illustrate certain selected embodiments of the invention and the views thereon are as follows.

The particular construction, for the purpose of illustrating the present invention, is shown specifically for forming blanks for making paper containers, such as paper cups, but blanks for other uses and purposes are included. The machine of the invention comprises a machine frame 1, Figs. 2 to 5, including a right-side upright member 2, a left-hand upright member 3, and a transverse plate-like member 4 which is connected to the uprights 2 and 3, the member 4 preferably being formed integral the uprights 2 and 3. The frame 1 includes side flanges or extensions 5 on the plate 4, so that the entire frame 1 may be bolted, or otherwise secured, to the frame, or to the superstructure of another machine or machine part, such as a printing machine, Figs. 18 and 19, with which the feeding, cutting, stripping and stacking mechanism cooperates, Figs. 1 to 5.

Figure 3:
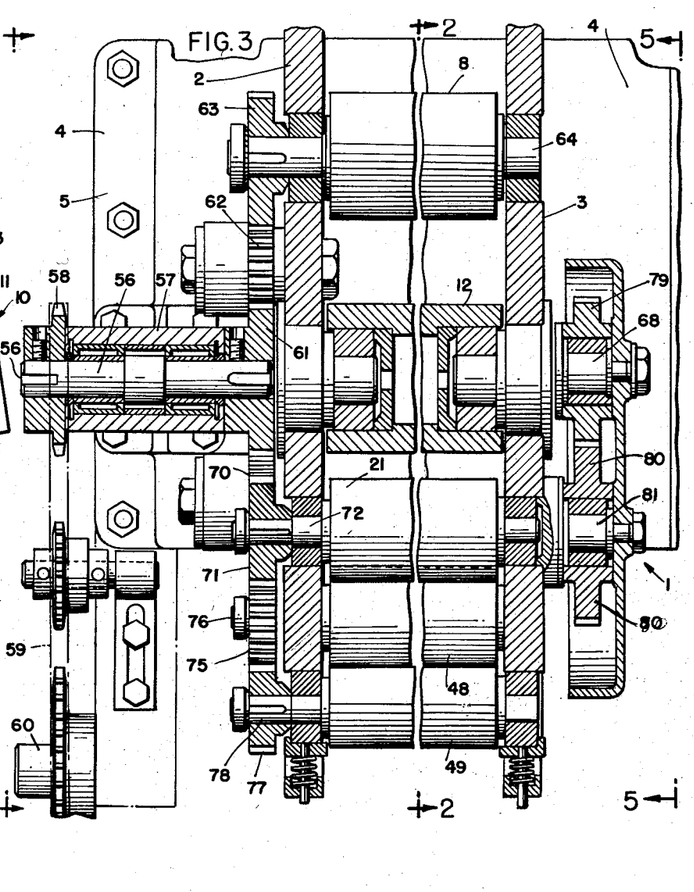
Fig. 3 is a detail vertical sectional view on the line 3—3 of Fig. 4.

Feed mechanism 6, Figs. 1 to 5, comprising a front feed roll 7, cooperates with a second or rear feed roll 8 to feed a web of material 9 therebetween. Each roll 7 and 8 is properly journaled in respective bearings in the frame 1, and is properly and synchronously driven to feed the continuous web 9 from a roll of paper, or other suitable material, Figs. 1 and 2. The feed rolls 7 and 8 feed the web 9 to cutter means 10, Figs. 1 to 3, which comprises a front cutter roll 11 and a rear anvil roll or platen 12, the web 9 being fed by the feed mechanism 6 to position between the rolls 11 and 12 of the cutter means 10. The backing anvil 12, Fig. 3, is freely mounted in bearings in the machine frame, while the cutter roll 11 is driven, Figs. 1 to 5. The driven cutter roll 11 carries knives or cutters 13 about its periphery, Figs. 1 and 2, to form a line of cut 14, Figs. 1 and 11, defining a blank 15, Fig. 12. Should the blank 15 be used for making a cup or other container, it may later be formed into an encircling wall for the paper container or cup.

The number of pitches or knives 13, the diameter of the cutter roll 11 and the size of the blank 15 all have a definite relation with respect to each other, the size of the blank 15 to be cut being the primary factor, as it is desirable from the standpoint of economy that there be as little waste of material, or scrap, as possible. In the present embodiment shown, there are three sets of cutters or knives 13 on the cutter roll 11, but a greater or lesser number of knives or cutters may be employed depending upon the size of the blank 15 to be cut, and the diameter of the cutter roll 11. The cutters or knives 13 may be any kind desired which are capable of performing the proper and preferred function. The cutters or knives 13 are herein shown as being separate members recessed in the periphery of the cutter roll 11 and secured in adjusted position by means of appropriate fastener devices, such as screws or bolts, Fig. 2.

It is extremely important that the line of cut 14 be definite, sharp and true, and preferably completely through the web, so that the blank 15 will be completely severed from the web, but still retained suspended within the web. However, it is entirely feasible that the line of cut may merely be an embossing line, or a partial line. In any event, the line of cut should be such that the resulting blank may be pushed out freely and easily from the web, and without tearing or otherwise mutilating the web or the blanks. It is desirable, in carrying out the invention, that the blank 15 be retained within the cutout line 14 of the web for a predetermined period of time until the blank 15 is positively, deliberately and definitely forced out or knocked out of the web and thereby leaves a clear opening 16 defined by the remaining material which includes the parts 17, 17 between the opening 16, and the side edge connecting parts 18, 18, Figs. 1 and 11. While a definite and sharp completely through line of cut is desirable and preferable, the operation of the machine, and the stacking of the blanks 15, will not be impaired because positive means are provided for definitely and positively knocking out or stripping each blank 15 from the web 9, even though in some instances the blank may be attached to the web by integral intacts which may occur because of dullness or nicks in the knives, or by any other reason.

After the line of cut 14 has been completed, the web 9, with the blank 15 suspended and remaining in place therein, is fed between lead roll means 19 which comprises a front lead roll 20 and a rear lead roll 21, Figs. 1 to 5. The rolls 20 and 21 grippingly receive the cut web 9 and its suspended blank therebetween. The lead rolls 20 and 21 lead the web 9, and its suspended blank 15, to a stripper, knock-out roller or member 22 so that each successive blank 15 will be deliberately stripped, or pushed out from the body of the web.

Figure 4:
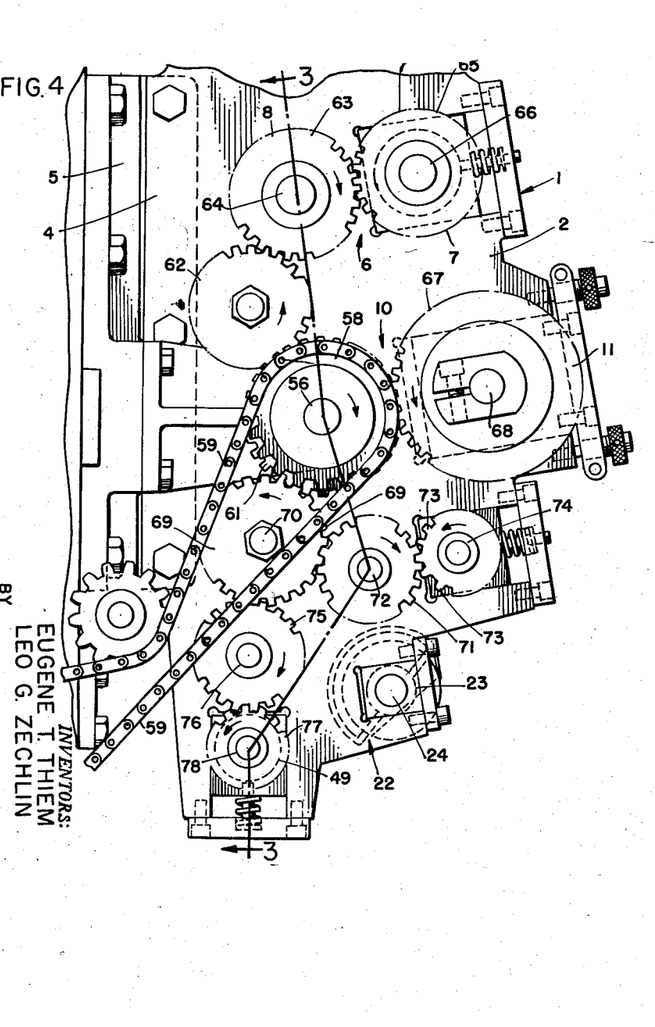
Fig. 4 is a detail elevational view of the right-hand side of the machine looking in the direction of the arrows 4—4 of Fig. 3.
Figure 5:
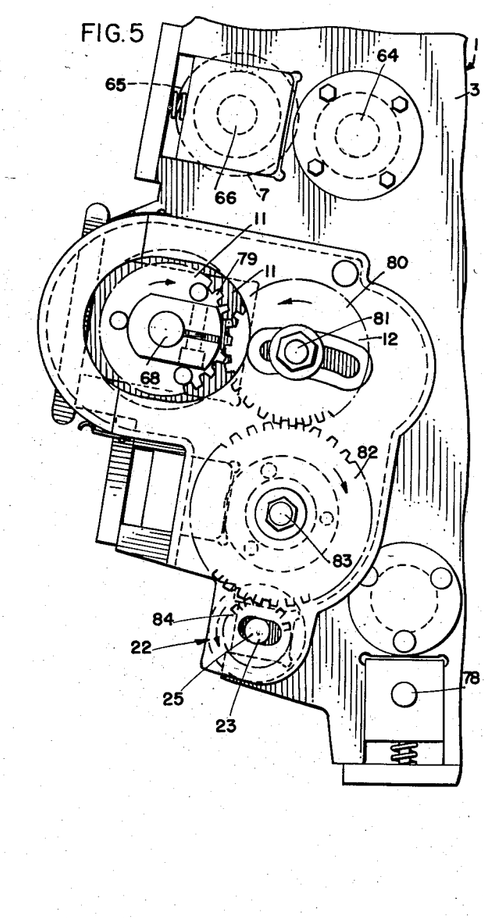
Fig. 5 is a detail elevational view of the left-hand side of the machine looking in the direction of the arrows 5—5 of Fig. 3.
Figure 11:
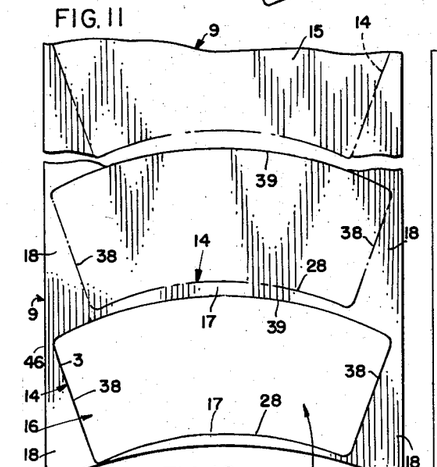
Fig. 11 is a detail vertical plan view of the web of material and the manner in which cup blanks are cut.
Figure 12:
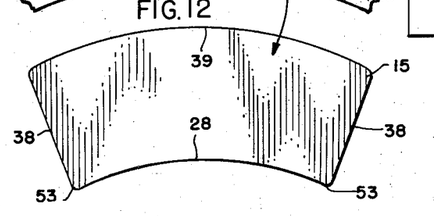
Fig. 12 is a plan view of one of the blanks which has been stripped from the web of material, the blank to form an enclosing wall for a cup.
Figure 13:
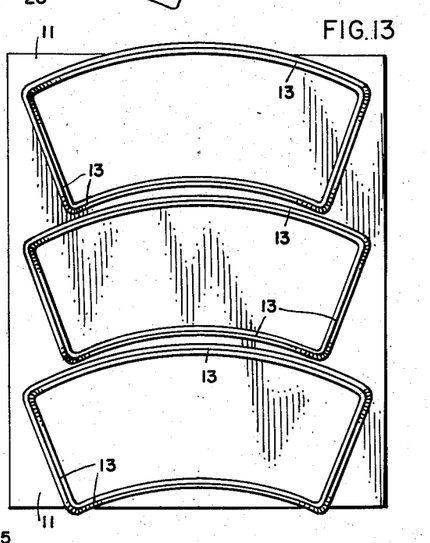
Fig. 13 is a detail plan layout or developed view of the cutter roll showing its relative relation to the web of material.

The stripper or knock-out member or roller 22, Figs. 6 to 9, comprises a longitudinal shaft 23 having reduced ends 24 and 25 mounted in bearings 26, 26, in the side rails 2 and 3 of the machine frame, the shaft 23 being driven in timed relation with the rotational operation of the cutter roll 11, Figs. 4 and 5. An elongated metal knock-out or stripper body part 27, Fig. 6, for stripping or knocking out the curved lower edge 28 of a blank 15, Figs. 11 and 12, is secured at 29 to spaced collars 30 which may be integral with the shaft 23. The elongated member 27 has an inwardly curved or arcuate edge 31, Fig. 6, which conforms generally to the curvature 28 of the lower side of the blank 15, as well as with the lower edge of the cut 14, also indicated at 28, Figs. 10 to 12. The outer edges of the arcuate line or edge 31, where it joins with its sides, form a nose 32 which first engages the blank 15 along the narrow bottom side 28 adjacent the side edges of the blank to relieve and release the blank from the web 9, Figs. 6 to 8.

Figure 6:
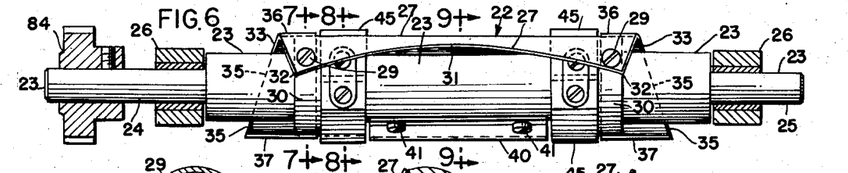
Fig. 6 is a detail elevational view of the stripper roll, parts being broken away for the sake of clearness.
Figures 7, 8, 9, 10:
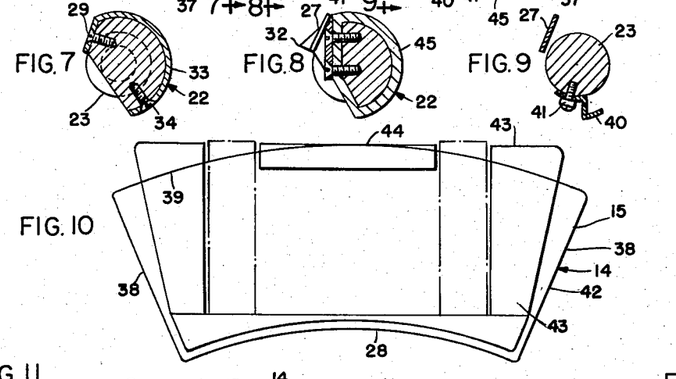
Figs. 7, 8 and 9 are detail transverse sectional views on the lines 7—7, 8—8 and 9—9 respectively of Fig. 6.
Fig. 10 is a detail plan layout or developed view of the stripper roll of Fig. 6, and showing its relation with respect to a cut blank.
Figure 14:
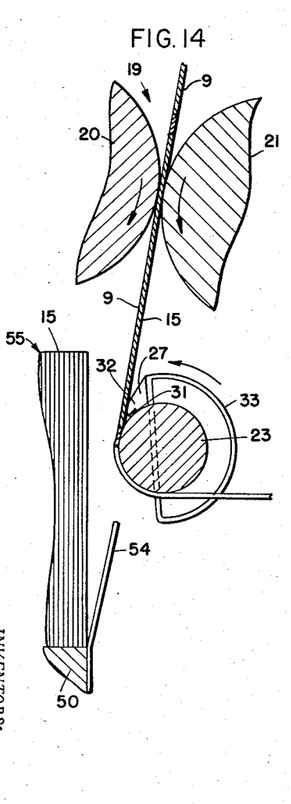
Figs. 14 to 17 inclusive are diagrammatic views at the line 14—14 of Fig. 1 and showing progressively the manner in which the stripper roll, strips or "knocks out" the suspended blank in the moving web, and the manner in which the blanks are stacked on edge in horizontal supporting relation.

Outwardly extending flared projecting side members 33, Figs. 6 and 7, are secured at 29 and at 34, Fig. 7, to the collar-like members 30, the members 33 each having a diagonal side edge 35 extending from its upper flat surface 36 to its lower flat surface 37, Fig. 6. The surface 36 engages the blank 15 immediately after the blank is engaged by the nose 32 and the arcuate edge 31 of the stripper part or member 27, progressively forcing out a blank 15 from the web 9 along the line 28, at the same time that the side edge 35 of each member 33 forces out the sides of a blank 15 along the line 38 of the blank 15, the line 38 also being coextensive with the line of cut 14 at the sides, Figs. 10 to 12. The stripper member 27, therefore, first starts to force out the blank 15 along the line 28, as shown in Fig. 14, whereupon the members 33 further force out the blank 15 progressively upwardly as the web is moving downwardly, the blank thus being pushed out gradually and progressively and the side edges being separated at the side lines 38 in the manner shown diagrammatically in Figs. 14 to 17. The inwardly extending arcuate side 31 at each side and the nose 32 as well as the outwardly projecting side edges 35 of the members 33, force out the blank at the bottom line 28 and the side lines 38 of a blank along the line of cut 14, to progressively and positively cause the blank to be pushed and released from the web 9, Figs. 14 to 17.

The top 39 of the line of cut 14 being also the upper end of the blank 15, also indicated at 39, Fig. 10, is released or caused to be pushed from the web by means of a relatively short transverse member 40 in the nature of a Z-bar, Figs. 6 and 9. The Z-bar 40 has its ends spaced inwardly from the collar members 30 a predetermined distance, being fastened to the shaft 23 by means of screws 41. Rotation of the stripper member thus causes the blank to be released and pushed out of the web at the conclusion of an operative cycle of the stripper 22.

In the embodiment herein shown, there is only one pusher surface or element shown on the stripper 22, but more than one such stripper surface may be provided on a single shaft 23 depending upon the size of the blank to be stripped, the speed of rotation of the stripper, and the diameter thereof.

The spaces between the lower and upper arcuate lines 28 and 39, Fig. 10, and the side boundary edges 38, 38 which define the blank space 16, are not quite coextensive in developed plan and size with respect to the plan and size of a blank 15. An encircling boundary line 42 which defines the limits of a blank 15, and the line of cut 14, is slightly greater than a rolled out plan, or developed view 43, Fig. 10, formed by one revolution of the stripper 22. Such rolled out plan or developed view 43 would not be identical with a blank 15, the line of cut 14 or the boundary line 42, Fig. 10. The pusher nose or part 32 and the arcuate line or edge 31 of the member 27 comes into pushing or stripping engagement with a blank 15 just shortly after the arcuate cut line 28 of the blank 15 reaches the relative positions of the developed plan 43 of the stripper with a blank 15. The side edges of the developed plan 43 are inside of the boundary line 42 of the blank or line of cut, while the upper line or edge 44 of the developed plan 43 is above the top line 39 of the blank 15 and line of cut 14, as shown in Fig. 10.

Resilient members 45, Figs. 6 and 8, made of elastomeric material, such as rubber, are arranged inside of the inner ends of the members 33 and outwardly of the outer ends of the transverse member 40, each member 45 being secured to the shaft 23.

The resilient members 45 are arcuate, relatively semicircular and of a diameter somewhat larger than the members 33 and much larger than the normal size of the shaft 23 over which the web normally passes. Therefore, while the shaft 23 has one peripheral speed, the members 45, being of large diameter, have a greater peripheral speed; and, inasmuch as the lineal speed of movement of the web is correlated with the rotative speed of the stripper shaft 23, the peripheral speed of the members 45 is greater than the normal rotative peripheral speed of the shaft 23 and the running speed of the web 9. Therefore, each time the members 45 come into contact with the web there will be applied a pulling action on the web by the members 45 causing the web to be pulled taut or, in effect, applying a pulling action on the web and thus materially aid in causing the blank to be pushed out of the web. The members 45 because of engagement with the web apply a pulling action on the web.

The members 45 serve firstly, to assist in knocking out the blank 15 by their cooperation with the members 27, 32, 33 and 40; secondly, to assist in feeding the blank 15 to a predetermined position; thirdly, to apply a frictional contact on the blank and to apply a pulling motion or action thereto to assist in freeing the blank, and fourthly, to advance the blanks.

The scrap 46 rides on the larger diameter of the shaft 23 which is dimensioned to web speed, the scrap 46 being the remaining part of the web between the lower side of one blank 15 or line of cut 14 and the upper side of an adjacent blank or line of cut, as indicated by the numeral 17, and the sides 18 which remain at the sides of the blank opening 16, Fig. 11. The scrap 46, therefore, is the remaining part of the web 9 after the blanks 15 have been removed therefrom and surrounds the opening 16 and the boundary line 42. The scrap 46 remains in a single web and passes over the shaft 23 to the roll means 47 at a relatively right angle position. It then passes through the scrap roll means 47 which comprises an upper scrap roll 48 and a lower scrap roll 49, between which the scrap is fed. The scrap slip feeds, but not such as to break the web, but still hold it taut. The scrap is directed in a generally straight downward position to a suitable receptacle, bin or box (not shown). The double angular bend of the scrap also acts in rendering the web taut.

Figure 15:
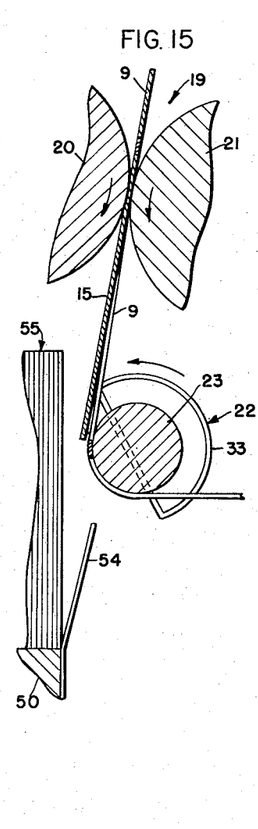
Figure 16:
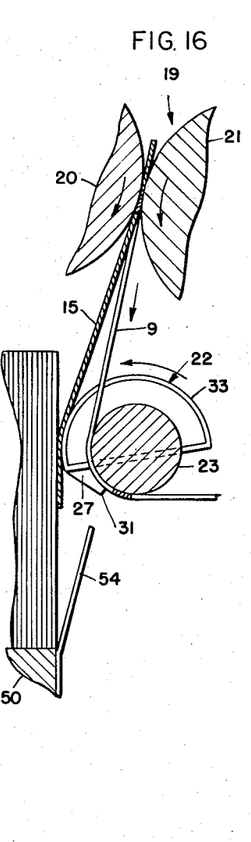
Figure 17:
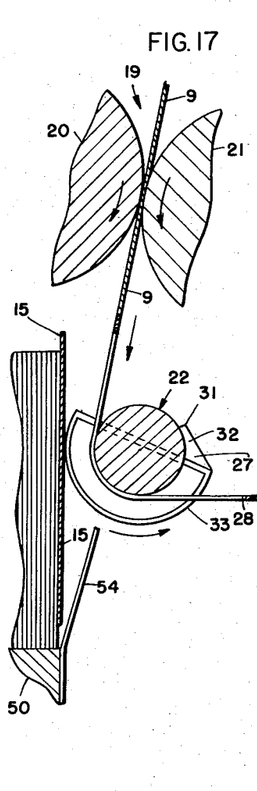

The stripper 22 first engages the blank at its lower side edges as shown in Fig. 14 and then causes the lower end of the blank to be urged and pushed out from the web progressively, first being engaged by the arcuate edge 31 of the member 27 and its nose 32, Fig. 15. The side members 33 then push out the blank along its side edges 38, progressively urging or pushing out the blank along its side edges, the blank being also assisted in the pushing out operation by the members 45, as shown in Fig. 16. The last pushing out operation is accomplished by the side members 33, the horizontal member 40, and the rubber or rubber-like members 45 so that the blank will assume the position shown in Fig. 17. The severed blank is thus finally stripped, or pushed out of the web, and caused to be arranged on a horizontal support, stand or platform 50, Fig. 1.

Figure 1:
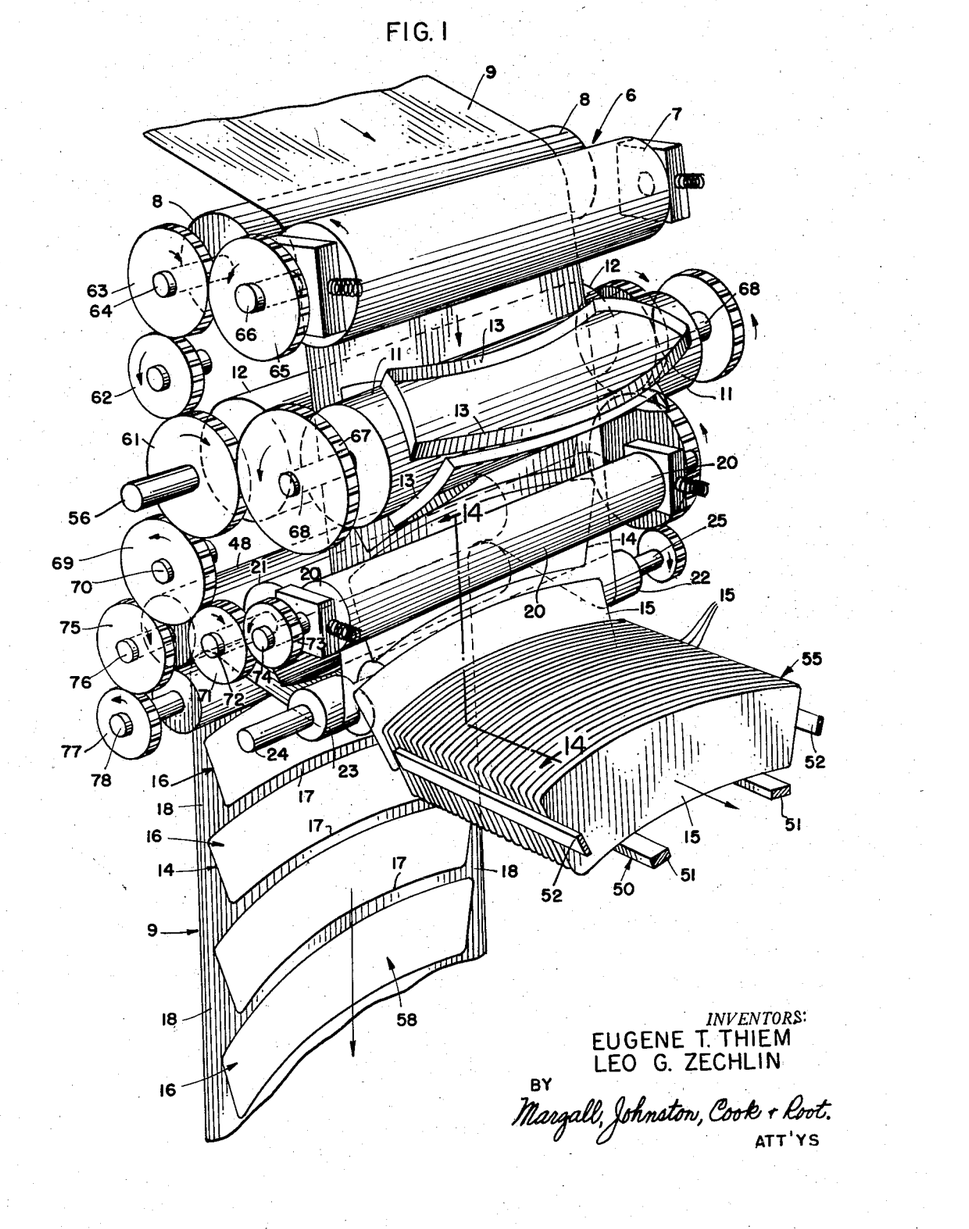
Fig. 1 is a detail perspective somewhat schematic view looking toward the front and right-hand side of the machine of the invention, and showing certain of feeding, cutting, stripping and stacking mechanism.
Figure 2:
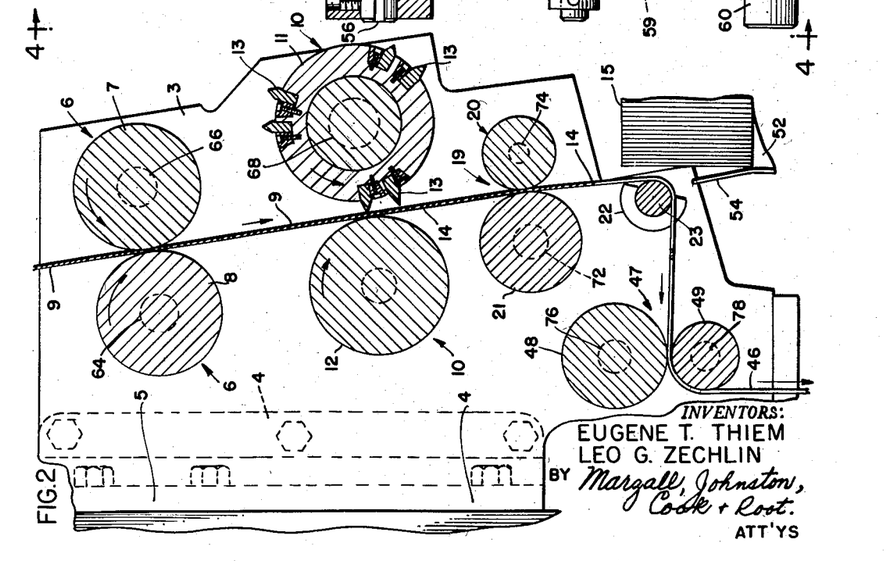
Fig. 2 is a detail longitudinal vertical sectional view on the line 2—2 of Fig. 3.

The platform 50, Fig. 1, comprises spaced horizontal bars or rods 51 and diverging inclined side bars or rods 52, Fig. 1, the lower edges 53 of each blank 15, Fig. 12, resting on the bottom horizontal rods 51 of the support 50, Fig. 1, the blank then being spaced from the web and in a plane relatively parallel to the normal line of movement of the web. The resilient members 45 push the blank outwardly and feed it downwardly so as to cause the blank to come into position in front of the previously pushed out stack of blanks and behind a vertically inclined guide member 54, Figs. 14 to 17. The blanks 15 are thus successively arranged to form a horizontal stack 55, Fig. 1, on the support 50, each subsequent blank being fed between the stack and the vertical guide member 54, as shown in Figs. 14 to 17. The stack 55 of blanks 15 is maintained in relatively upright position by means of a weight or other element which slides along the support an increment equal to the thickness of a blank, the stack being moved along the support after each blank comes to a predetermined position after being pulled downwardly and forced outwardly by the continuous rotation of the stripper.

Immediately after the blank has been stripped out of the web, the scrap 46, including the connecting cross strips 17, and the side parts 18 which define the blank opening 16 formed by the line of cut 14, is guided and fed by the scrap rolls 48 and 49 to a receptacle.

All the elements for feeding the web, severing or blanking the same, knocking out the blank, stacking the blanks and delivering the scrap are properly synchronized and operate in proper timed relation, all said elements being operated from a single source of power means.

The power means may comprise a stub shaft 56, Fig. 3, which is mounted in suitable bearings 57 on the side frame 2, the shaft 56 being in general axial alinement with the freely mounted anvil roller 12 but disconnected therefrom, Figs. 1, 3 and 4. A sprocket 58, Figs. 3 and 4, is fastened to the shaft 56, being driven by a sprocket chain 59 from a prime mover, such as a drive shaft 60, Fig. 3. A gear 61, Figs. 3 and 4, is fastened to the shaft 56 and drives an idler gear 62 on a stub shaft, the idler gear 62 meshing with a gear 63 on the shaft 64 of the rear roll 8, Figs. 3 and 4. The gear 63 meshes with and drives a gear 65 on the shaft 66 upon which the front feed roll 7 is mounted, Fig. 4. The drive gear 61, on the shaft 56, Fig. 4, also meshes with a gear 67 on the shaft 68 of the cutter roll 11. The anvil roll 12 is not driven by any gearing but instead is freely rotatable, obtaining its rotation from the cutter roll 11 by the web passing between the cutter roll and the anvil. The gear 61 also drives an idler gear 69, Fig. 4, on a stub shaft 70 which is mounted on the side frame 2. The idler gear 69 drives a gear 71 on the shaft of the rear lead roll 21, the gear 71 meshing with a gear 73, of the shaft 74 of the front lead roll 20. The idler gear 69, Fig. 4, also drives a gear 75 on the shaft 76 of the upper scrap roll 48, the gear 75 meshing with a gear 77 on the shaft 78 of the lower scrap roll 49, Figs. 3 and 4. The shafts for all of the said rolls are properly mounted in appropriate bearings in the machine frame.

The stripper 22, to the right, Fig. 3, is operated by a gear 79, Figs. 3 and 5, on the end of the cutter roll shaft 68 and meshes with an idler gear 80 on a shiftable stub shaft 81. The idler gear 80, Fig. 5, drives a second idler gear 82 on a stub shaft 83 which latter gear 82 drives a gear 84 on the shaft 23 of the stripper 22.

Figure 18:
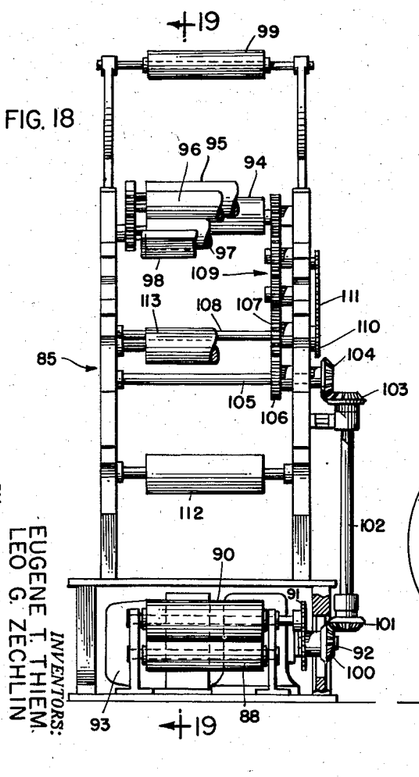
Fig. 18 is a rear elevational view looking in the direction of the arrows 18—18 of Fig. 19 and showing the manner in which the web is fed from a roll and then printed, blanked, stripped and stacked in successive steps of operations.
Figure 19:
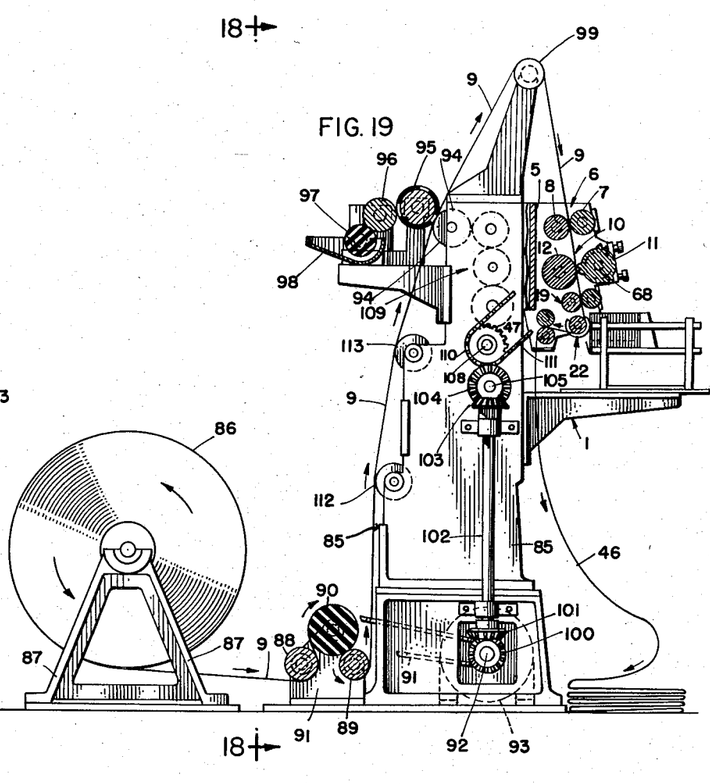
Fig. 19 is a detail vertical sectional view on the line 19—19 of Fig. 18.

The structure previously described, and as disclosed in Figs. 1 to 17 inclusive, comprises a complete operable unit for continuously feeding the web and blanking and stacking the same. However, the unit may be incorporated in connection with a printing machine whereby the web is fed from the continuous roll and then printed; and immediately after the printing operation, the web is fed, blanked and the blanks then stacked as previously described. In Figs. 18 and 19 there is shown a machine for incorporating the entire operation from feeding a web, printing, then blanking and finally stacking the blanks.

The machine disclosed in Figs. 18 and 19 comprises an upright frame 85 comprising spaced vertical uprights to which the frame 1 is attached by bolting, or otherwise fastening the same by connecting the transverse flange 5 to the spaced uprights of the frame 1, Fig. 19. The web 9 of the material is fed from a roll 86 which is revolvably mounted or supported on a stand, easel or support 87. The web 9 engages wrap rolls 88 and 89, and a booster roll 90 which are mounted on a support 91. The booster roll 90 may be made of any suitable material capable of performing the desired function but is herein shown specifically as being made of rubber and is engaged by the web 9 so as to effect proper feed of the web, and to render a snubbing or drawing action thereon to maintain the web relatively taut, but still allow freedom of motion of the web 9. The booster roll 90 is shown as being driven by a chain 91 from the shaft 92 of a motor 93. The web 9, thus, passes upwardly between an impression cylinder or roll 94 and a printing plate cylinder 95. An ink transfer roll 96 engages the printing cylinder 95 upon which the printing type is mounted about the periphery thereof to print a name, symbol, or design on the web 9 as the web moves freely between the printing roll 95 and the impression or platen roll 94. Ink is transferred from an ink transfer roll 96 to the cylinder printing rolls 95 by means of an ink fountain roll 97 which is arranged in an ink fountain 98, Figs. 18 and 19. After the web 9 has passed through the rolls 94 and 95, the printed web passes over an ink drying extension roll 99 (extreme top, Fig. 19) where it passes between the feed roll means 6 comprising the outer feed roll 7 and the inner feed roll 8.

The web of material 9 from the roll 86, therefore, is fed by the wrap rolls 88 and 89 and the booster roll 90 through the printing rolls 94 and 95, and thence downwardly between the feed rolls 7 and 8 where it is cut and blanked by the cutter roll means 10. The web then passes through the lead roll means 19 where the blanks are pushed out by the stripper means 22, the completed blanks being stacked on the support 50. The scrap 46 passes from the stripper shaft 23 at a general right angle to position between the scrap roll means 47 and returns angularly from the roll 49 where it is discharged in a suitable receptacle (not shown).

The means for causing operation of the printing rolls 94 and 95, Figs. 18 and 19, may comprise a beveled gear 100 on the motor shaft 92 and drive another beveled gear 101 on a vertical shaft 102. The vertical shaft 102 has a beveled gear 103 at its upper end and engages a beveled gear 104. The beveled gear 104 is mounted on a transverse shaft 105 upon which there is also mounted a gear 106 meshing with a gear 107 on a transverse shaft 108. The gear 107 drives the impression cylinder 94 through a gear train designated generally by the numeral 109, Fig. 19. The shaft 108 carries a sprocket 110 over which a sprocket chain 111 is trained. The chain 111 may also drive the previously mentioned sprocket 58 on the shaft 56 instead of employing the chain 59 driven from the prime mover 60 as previously described.

In cases where the printing means is to comprise a unitary printing and blanking device, as shown in Figs. 18 and 19, the power to the shaft 56 may be applied in the manner shown in Figs. 18 and 19, instead of in the manner shown in Fig. 3. It is unimportant whether the chain 111 drives the sprocket 58, or whether a separate sprocket (not shown) is employed to drive the shaft 58. The important thing, however, is that the shaft 58 be driven in proper timed relation with the other driving members so that proper correlation and timing are attained throughout the full operation from start to finish. Where the drive is obtained through the gearing shown in Figs. 18 and 19, the previously mentioned chain 59 will no longer be required as power to drive the sprocket shaft 56 may be obtained directly through gearing from the shaft 92 of the motor 93 instead of from the previously mentioned shaft 60, as shown in Figs. 3 and 4.

In cases where multicolor operations are desired, there may be provided additional impression cylinders 112 and 113 which cooperate with printing plate rollers, ink transfer rolls and ink fountains similar to the elements 95 to 98 inclusive.

The invention, therefore, provides means for printing a web, feeding the printed web to the feed means 6 to feed the web to position where a line of cut is provided in the web by the cutting roller 11 and the cooperating anvil 12, the printed and cut web then passing through the lead roll means 19 and through the knockout or stripper 22 where the blanks are knocked out successively and arranged in stacked formation on the platform 50. The printing of the blank occurs close to the feed roll means 6 and the cutter means 10, the parts operating in correlated relation. The printing on the web and the timing is such that the line of cut 14 will always be in proper position with respect to the printed area on the web.

The periphery of the printing plate cylinder 95 is of proper size with respect to the size of the cutter means 10, and with respect to the stripper 22. The plate cylinder 95, the cutting roll 11 and the stripper each is of the proper proportionate size with respect to each other, the sizes being determined by the periphery or circumference of the elements 95, 11 and 22. The members 95, 10 and 22, therefore, are proportionate to their diameters.

The cylinder 95 may have one pitch, that is, one printing surface thereon; the cutting roller 11 may have one pitch, that is, one cutter thereon; and the stripper member 22 may have one pitch, that is, one stripper or knockout portion thereon. However, as specifically shown herein, the plate cylinder 95 is provided with three pitches, the cutter roll 11 has three pitches 13, while the stripper roll 22 has only one stripper pitch. Therefore, it is necessary in all instances that there be proper proportion and correlation of the number of pitches with respect to the length of the pitches as well as to the diameter of each roll. Instead of a three-pitch printing plate cylinder and a three-pitch cutting roller 11 and a single pitch stripper 22, of a ratio of three, three and one, as specifically shown, there may be two pitches on the printing roll 95, two pitches on the cutter roll 11, and one pitch on the stripper 22. However, the printing plate cylinder or roll 95 may have four pitches and the cutter roll 11 may also have four pitches, while the stripper roll 22 may have two pitches. In any event, the number of pitches, the length of the pitch, and the diameter of the three members 95, 11 and 22 must be properly proportioned, and the speed thereof must be correlated, so that the line of cut 14 formed by the cutter means 10 will be such that the line of cut will be in proper position with respect to the printing pitch of the plate cylinder 95. Also, the size and speed of rotation of the stripper roll 22 must be correlated and in proportion with the members 95 and 11. It is also necessary, from a practical standpoint of saving material, that there be as many pitches as possible and still maintain the size of the cylinders 95, 11 and 22 within practical limits. Therefore, the number of pitches, the length of each pitch, and the diameter of the elements 95, 11 and 22 have a direct bearing.

For instance, if N represents any number of pitches and P represents the length of a pitch, and D represents the diameter of the stripper, the mathematical formula or equation will be:

$$D = \frac{N \times P}{Pi}$$

with respect to the cutter.

If D′ represents the diameter of the cutter 11, and N is the number of pitches, and P is the length of the pitch, the mathematical formula or equation will be:

$$D' = \frac{N \times P}{Pi}$$

Also, if D″ is the diameter of the printing roll 95, and N designates the number of pitches thereon, and P is the length of the printing pitch, the mathematical formula or equation will be:

$$D'' = \frac{N \times P}{Pi}$$

Therefore, the diameter of the type roller, the diameter of the cutter, and the diameter of the stripper, with respect to the number and size of pitches will be:

$$D = \frac{N \times P}{Pi}$$

It has been found that this mathematical equation permits any size roll to be used, providing the size of the rolls 95, 11 and 22, the pitches and size of pitches, are in proper relative proportions, and are properly correlated to effect the printing, cutting and stripping operations in the proper and regular successive sequences.

There are instances where the blank 15 may be relatively large, particularly in cases where the blank is relatively long vertically. In such instances it may be possible that there will not be sufficient room at the adjacent end of the stack to receive the successive oncoming blanks 15 freely without bending or otherwise causing the blanks to become fouled or multilated. It is desirable, therefore, that means be provided to cause the blanks adjacent the stack, at the web, to be shifted or pushed away to provide sufficient room for the successive oncoming blanks to be arranged properly to stacking position. It is also desirable that means be provided to hold the blanks in stacked formation and to prevent stacked blanks from creeping or shifting inwardly toward the web and the oncoming blank.

Figure 20:
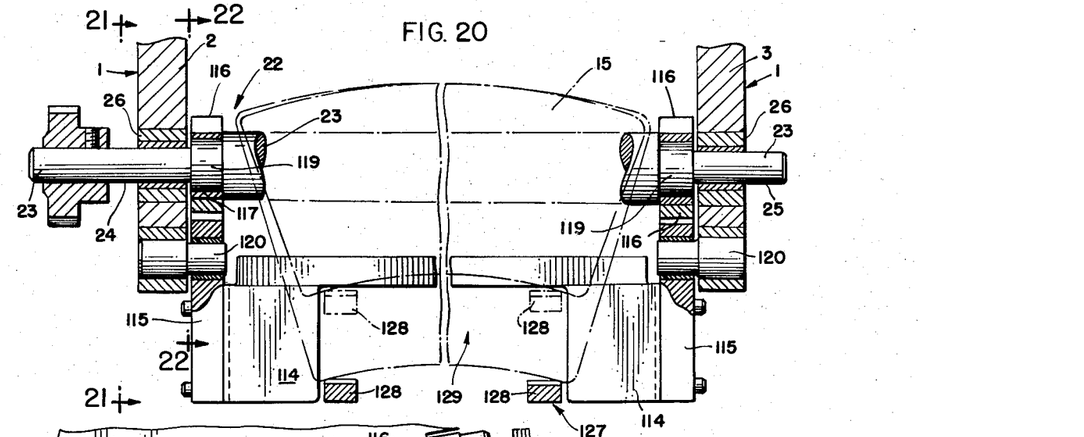
Fig. 20 is a detail elevational view, partly in section, similar to Fig. 6 showing a stripper for use with large blanks, and a pusher member to push successive blanks away from the machine mechanism and to prevent prior stacked blanks from moving in a reverse direction whereby fouling of blanks is eliminated.
Figures 21, 22:
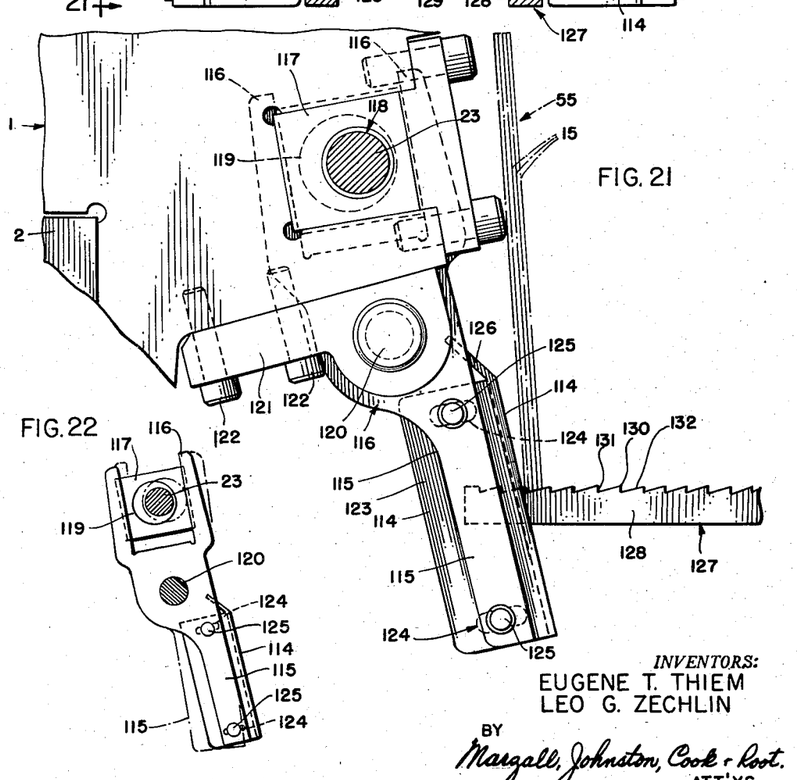
Fig. 21 is a detail transverse sectional view on the line 21—21 of Fig. 20.
Fig. 22 is a diagrammatic or schematic elevational view on the line 22—22 of Fig. 20 showing the relative positions of the operable member of Figs. 20 and 21.

The means for accomplishing these desiderata are shown in Figs. 20 to 22, wherein a plate-like member 114, positioned adjacent the stack 55 of blanks 15 and adjacent the web, is operated so that the oncoming successive blanks will be fed freely and easily in regular proper sequence to a position on a stacking platform and in contacting engagement with the preceding blank of the stack.

The plate-like member 114 is adjustably connected at its opposite ends to legs 115 of spaced members 116 in the form of yokes having bifurcated upper ends to receive demountable bearing blocks 117. Each bearing block 117 is provided with an opening 118 to receive an eccentric, or an eccentric part, 119 on the shaft 23 of the stripper means 22. The eccentrics 119 are spaced apart on the shaft 23 and are preferably formed integral therewith, being positioned inwardly of the side members 2 and 3 of the frame 1 and in close proximity thereto.

Each yoke 116 is pivotally mounted on a pin, or stub shaft, 120 arranged below the shaft 23. The pins 120 may be mounted in fittings 121 fastened to the respective sides 2 and 3 of the frame 1 by means of bolts 122, Fig. 21.

The arrangement is such, therefore, that during the rotation of the shaft 23, the yokes 116 will be caused to be oscillated on their pivots 120, and, thus, oscillate the legs 115 in the manner shown in Fig. 22. Inasmuch as the plate 114 is secured to the legs 115, the plate 114 will oscillate forwardly and rearwardly and engage the stack 55 of blanks 15, and shift the blanks to the right, Fig. 21. The legs 115 are shown as being in their extreme forward, or stack engaging, position in Fig. 21, and in full lines in Fig. 22.

The plate 114 extends between the legs 115, being bent at its opposite ends to provide inwardly extending side edges or flanges 123, Fig. 21. The side edges or flanges 123 are provided with upper and lower elongated slots 124 which are secured to the legs 115 by means of fasteners 125, such as bolts, or the like. The upper edge of the plate 114 is provided with a downwardly sloping surface 126 which is adapted to be engaged by a blank and tends to guide the blank to position on a support or rack 127 upon which the blanks may be stacked.

The support 127 upon which the blanks are to be stacked may embody a form, construction and arrangement different than the previously described stacking platform 50 so that blanks of various sizes may be accommodated by shifting the support, or parts thereof, to support blanks of various and different sizes. The support 127 may comprise spaced rods or bars 128 upon which the lower edges of the blanks may be engaged. The members 128 may be arranged in one position, as shown in full lines in Fig. 20, to accommodate large blanks, or moved to another supporting position to support blanks of a smaller size, as shown in dotted lines in Fig. 20. Or, the members 128 may be shifted to any desirable intermediate position. The dotted line position in Fig. 20 shows the members 128 as occupying substantially the same location as the bars or rods 51 of the stacker 50, Fig. 1. Also, side supports (not shown) but similar to the members 52, Fig. 1, may be removably and adjustably positioned so as to support the side edges of the larger blanks. It is immaterial whether separate supports or platforms are provided and moved to position to receive the blanks, or whether removable and adjustable rods are used to support the blanks, just so means are provided to accommodate blanks in stacked formation. The plate 114 is cut away at 129, Fig. 20, to make provision for adjustable rods 128, or to make room for separate supports 127, to accommodate blanks of various sizes.

The rods 128 which support the stack of blanks may be provided with one or more spaced teeth 130 each having a relatively vertical edge 131 with an intermediate sloping surface 132, whereby blanks will be prevented from shifting toward the stripper and the operating plate 114, but still allow the blanks to be pushed easily in a forward direction. In any event, however, it is preferable that the bars or rods 128 be provided with one or more teeth 130, or other serrations, to prevent movement of the stack, or the blanks thereof, in a predetermined direction. This is true whether the rods comprise the members 51, 51, Fig. 1, or whether other types and kinds of supports or independent supporting platforms are to be used.

The plate 114, being oscillated by the bifurcated or forked member 116, pushes the stack away, and, thus, when the members 45 have been rotated to a position so as not to be in stripping or knock-out position (Fig. 14) there will be an abundance of space between the stack and the web to permit free movement of the oncoming blank.

The invention provides a relatively simple, positively operating and efficient device for: first, printing a predetermined print or design on the web; second, cutting a blank in proper proportion, location and size with respect to the printed area; and third, stripping the blank from the web and leaving as little waste as possible. The device of the invention may embody only the feeding, cutting or blanking and stacking operations as disclosed in Figs. 1–17 inclusive, or in addition, the device may include one or more printing operations so as to effect proper printing, proper feeding, proper cutting, and proper stripping in regular successive sequences at the exact precise locations. Also, the machine may be provided with an oscillating member which is adapted to engage the last inserted blank of a stack to shift the stack to provide a space permitting oncoming successive blanks to be received in proper position at the front of the stack without in any way fouling the oncoming blank. The stack platform may include removable, adjustable parts adapted to be positioned in different positions and levels so as to accommodate blanks of various sizes. The blank support may be configurated with teeth or other serrations to prevent shifting of the stack.

Changes may be made in the form, construction and arrangement of the parts without departing from the spirit of the invention or sacrificing any of its advantages, and the right is hereby reserved to make all such changes which fall fairly within the scope of the following claims.

The invention is hereby claimed as follows:

1. The method of forming blanks successively and continuously from a continuous running web and stripping the blanks therefrom which consists in forming successive lines of spaced cuts in the running web to define a blank and maintaining said blank in the web within the confines of a line of cut, and then progressively forcing successive blanks out of the web within said lines of cut, and finally stacking successive blanks on an edge thereof perpendicular to the running web.

2. An apparatus for blanking, stripping and stacking blanks from a continuously running web comprising cutter means to form lines of cut successively in the web to form blanks, feed means to feed the web to the cutter means, rotary means successively engaging the blanks within their respective lines of cut to deliberately force successive blanks out of the web, and means including said rotary means to feed each successive blank to stacking position.

3. An apparatus for blanking, stripping and stacking blanks from a continuously running web comprising cutter means to form lines of cut successively in the web to form blanks, feed means to feed the web to the cutter means, rotary means engaging each blank successively within its line of cut to deliberately force each blank out of the web successively and stack the blanks in a plane generally parallel to the web.

4. A cup blanking machine comprising feed means to feed a constantly running web, cutter means to form successive lines of cut in the web to define blanks suspended in the web, stripper means to strip each successive blank progressively from the running web, and means to stack successive stripped blanks in a plane parallel to the web.

5. A machine for forming cup blanks comprising cutter means to form a line of cut in a running web to form a blank, means to maintain said blank in suspension in the web, means to strip a suspended blank out of said web, and means to apply a tension on the web and the blank during the stripper operation and to feed the blank to a predetermined position.

6. A machine for forming blanks comprising cutter means to form a line of cut in a running web to form a blank, means to maintain said blank in suspension in the web, means to strip a suspended blank out of said web, and means to urge the blank to a predetermined position at a speed greater than the running speed of the web.

7. A machine for forming blanks comprising cutter means to form a line of cut in a running web to define a blank, means to maintain said blank in suspension in the web, means to strip a suspended blank out of said web, means to urge the blank to a predetermined position at a speed greater than the running speed of the web, and means to support successive stripped blanks in stacked formation in a horizontal plane with the blanks resting on a part of their peripheral edges.

8. A machine for forming blanks comprising cutter means to form a line of cut of a predetermined configuration in a constantly running web to form successive blanks defined by the line of cut and suspended in the web and in the same plane of the web, stripper means to urge each successive blank out of said web progressively, means to operate the stripper means at a peripheral speed greater than the running speed of the web, and elastomatic means on the stripper means to feed a stripped blank to a predetermined position.

9. A machine for forming blanks comprising feed rolls to feed a constantly running web, cutter means between which the web passes and including a rotating cutter roll and a cooperating anvil roll, there being a plurality of cutters on the cutter roll, each cutter defining a line of cut coextensive with the size and shape of a blank, the blank being defined by the line of cut and being held in suspension in the web, a stripper roll to push the blank out of the web, and means to rotate the stripper roll, means on the stripper roll to assist in removing the blank from the web, said last named means having a peripheral speed greater than the running speed of the web.

10. A machine for forming blanks comprising feed rolls to feed a constantly running web, cutter means between which the web passes and including a rotating cutter roll and a cooperating anvil roll, there being a plurality of cutter pitches on the cutter roll, each cutter defining a line of cut coextensive with the size and shape of a blank, the blank defined by the line of cut being held in suspension in the web, a stripper roll to push the blank out of the web, means to rotate the stripper roll, means on the stripper roll to assist in pushing out the blank, said last named means having a peripheral speed greater than the running speed of the web, said cutter roll being of a diameter sufficient to carry such plurality of cutting pitches about its periphery, said stripper roll having at least one pitch on its periphery, and means to correlate the rotation of the cutter roll and the stripper roll so that a pitch on the srtipper roll will engage blanks successively.

11. A device for forming blanks for use in making paper cups comprising feed rolls to feed a web continuously from a roll of paper, a cutter roll, an anvil roll adjacent thereto and between which rolls the constantly moving web passes to form successive lines of cut defining blanks held in suspension in said web, stripper roll means to push out blanks successively from the web and feed each successive blank on a part of its marginal periphery in stacked formation generally parallel to the running web, means to rotate the cutter roll, means to rotate the stripper roll, means to rotate the feed rolls, all said three last named means being correlated to operate in timed relation, said stripper roll means comprising a longitudinal arcuate bar engageable with one side of the blank to urge outwardly a side of the blank, opposed side members to urge progressively the side edges of the blank outwardly, a longitudinal bar to urge the other side of the blank and force the blank out of the web, and rubber means engaging the blank and web and applying a pulling action on the web and blank and a feeding action of the released blank.

12. A device for forming blanks for use in making paper cups comprising feed rolls to feed a web continuously from a roll of paper, a cutter roll, an anvil roll adjacent thereto and between which rolls the constantly moving web passes to form successive lines of cut defining blanks held in suspension in said web, stripper roll means to push out blanks successively from the web and feed each successive blank on a part of its marginal periphery in stacked formation generally parallel to the running web, means to rotate the cutter roll, means to rotate the stripper roll, means to rotate the feed rolls, all said three last named means being correlated to operate in timed relation, said stripper roll means comprising a longitudinal arcuate bar engageable with one side of the blank to urge outwardly a side of the blank, opposed side members to urge progressively the side edges of the blank outwardly, a longitudinal bar to urge the other side of the blank and force the blank out of the web, spaced apart resilient means engaging the blank and web and applying a pulling action on the web and blank and assisting in forcing out the blank from the web and feeding it to a predetermined position, means supporting successive blanks in stacked formation, and means operated by a part of the stripper means and engageable with the stack to shift the stack to prevent fouling of successive blanks as they are fed to said predetermined position.

13. A device for forming blanks for use in making paper cups comprising feed rolls to feed a web continuously from a roll of paper, a cutter roll, an anvil roll adjacent thereto and between which rolls the constantly moving web passes to form successive lines of cut defining blanks held in suspension in said web, stripper roll means to push out blanks successively from the web and feed each successive blank on a part of its marginal periphery in stacked formation generally parallel to the running web, means to rotate the cutter roll, means to rotate the stripper roll, means to rotate the feed rolls, all said three last named means being correlated to operate in timed relation, said stripper roll means comprising a longitudinal arcuate bar engageable with one side of the blank to urge outwardly a side of the blank, opposed side members to urge progressively the side edges of the blank outwardly, a longitudinal bar to urge the other side of the blank and force the blank out of the web, spaced apart resilient means engaging the blank and applying a pulling action on the blank and assisting in forcing out the blank from the web and feeding it to a predetermined position, blank supporting means supporting successive blanks in stacked formation, means operated by a part of the stripper means and engageable with the stack to shift the stack to prevent fouling of successive blanks as they are fed to said predetermined position, said last named means comprising a pair of spaced apart yokes, a plate adjustably connected to the yokes, means pivotally mounting said yokes, and an eccentric means carried by the stripper means and oscillated thereby for oscillating said yokes.

14. A device for forming blanks for use in making paper cups comprising feed rolls to feed a web continuously from a roll of paper, a cutter roll, an anvil roll adjacent thereto and between which rolls the constantly moving web passes to form successive lines of cut defining blanks held in suspension in said web, stripper roll means to push out blanks successively from the web and feed each successive blank on a part of its marginal periphery in stacked formation generally parallel to the running web, means to rotate the cutter roll, means to rotate the stripper roll, means to rotate the feed rolls, all said three last named means being correlated to operate in timed relation, said stripper roll means comprising a longitudinal arcuate bar engageable with one side of the blank to urge outwardly a side of the blank, opposed side members to urge progressively the side edges of the blank outwardly, a longitudinal bar to urge the other side of the blank and force the blank out of the web, spaced apart resilient means engaging the blank and applying a pulling action on the blank and assisting in forcing out the blank from the web and feeding it to a predetermined position, blank supporting means supporting successive blanks in stacked formation, means operated by a part of the stripper means and engageable with the stack to shift the stack to prevent fouling of successive blanks as they are fed to said predetermined position, said last named means comprising a pair of spaced apart yokes, a plate adjustably connected to the yokes, means pivotally mounting said yokes, and an eccentric means carried by the stripper means and oscillated thereby for oscillating said yokes, said plate being formed with a cut-out, said blank supporting means having a part thereof receivable in said opening.

15. A stripper mechanism for pushing cut blanks from a running web comprising a rotating shaft, a member on said shaft for urging the blanks from the web successively, and additional means on the shaft and engaging a part of the blank to assist in further urging the blanks from the web.

16. A stripper mechanism for pushing cut blanks from a running web comprising a rotating shaft, a member on said shaft for urging the blanks from the web successively, additional means on the shaft and engaging a part of the blank to assist in further urging the blanks from the web, and spaced members on the shaft having an orbital path greater than said first member and said additional means.

17. A stripper mechanism for pushing cut blanks from a running web comprising a rotating shaft, a member on said shaft for urging the blanks from the web successively, and an eccentric on the shaft, pivotally mounted yoke means oscillated by said eccentric, and a plate secured to the yoke means.

18. In a machine of the class described comprising means to feed a web of material continuously, means to cut blanks consecutively from the web, stripper means to push out the blanks consecutively from the web leaving a scrap web, and scrap rolls spaced from the stripper means and receiving the scrap web therebetween, the scrap web passing over the stripper at a general right angle and then over a scrap roll in a plane generally parallel to the movement of the web before the web reaches the stripper means.

19. In a machine of the class described comprising means for punching out blanks consecutively from a running web, means to stack blanks in a predetermined relation on a support, and oscillating means engageable periodically with a stack of blanks to shift said stack on said support in a predetermined direction, said oscillating means comprising a pair of spaced apart pivotally mounted yokes, eccentric means engaging the yokes to oscillate said yokes on their pivots, legs on said yokes, and a plate adjustably mounted on said legs and engaging said stack.

20. In a machine of the class described comprising means for punching out blanks consecutively from a running web, means to stack blanks in a predetermined relation on a support, and oscillating means engageable periodically with a stack of blanks to shift said stack on said support in a predetermined direction, said oscillating means comprising a pair of spaced apart pivotally mounted yokes, eccentric means engaging the yokes to oscillate said yokes on their pivots, legs on said yokes, and a plate adjustably mounted on said legs and engaging said stack, said plate having a part thereof cut away to receive a part of said support.

21. Blanking and stacking means comprising means for forming blanks successively from a running web, means for stripping blanks successively and depositing said blanks in stacked formation, means to support said blanks in stacked formation, and means intermittently engaging said stack of blanks to advance the stacked blanks on the support in a predetermined line of advancement, said second named means assisting in advancing successive blanks and preceding blanks along said line of advancement.

22. The method of making and handling blanks which comprises continuously moving a web of material along a predetermined path, successively forming lines of cut in said web to define successive blanks, and gradually forcing successive blanks out of said web including the steps of applying pressure against the leading edges of the blanks, applying a pulling action on the web to aid in freeing the blank from the web, and applying pressure along the trailing edges of said blanks.

23. The method of making and handling blanks which comprises continuously moving a web of material along a predetermined path, successively forming lines of cut in said web to define successive blanks, and gradually forcing successive blanks out of said web including the steps of applying pressure against the leading edges of the blanks, applying a pulling action on the web to aid in freeing the blank from the web, successively applying pressure along the side edges of the blanks, and applying pressure along the trailing edges of said blanks.

24. The method of making and handling blanks which comprises continuously moving a web of material along a predetermined path, successively forming lines of cut in said web to define successive blanks, and gradually forcing successive blanks out of said web including the steps of applying pressure against the leading edges of the blanks, applying a pulling action on the web to aid in freeing the blank from the web, successively applying pressure along the side edges of the blanks, and applying pressure along the trailing edges of said blanks, and stacking the blanks in upright position on a substantially horizontally extending support.

25. A stripper mechanism for gradually removing successive blanks from a moving web comprising means revolvable on a shaft including a longitudinal arcuate bar engageable with the leading edge portion of each blank, opposed side members extending circumferentially from said bar to engage progressively the side edges of each blank, a second longitudinal bar circumferentially spaced from said arcuate bar and engageable with the trailing edge portions of each blank, and axially spaced resilient members extending coaxial with said shaft and partially therearound for assisting in freeing the blanks from the web.

26. Combination stripper and stacking mechanism for removing successive blanks from a moving web and stacking same on a substantially horizontal surface which comprises means revolvable on a shaft including an axially extending arcuate bar engageable with the leading edge portions of each blank, opposed side members extending circumferentially from said bar to engage progressively the side edges of each blank, a second longitudinal bar circumferentially spaced from said arcuate bar and engageable with the trailing edge portions of each blank, and axially spaced resilient members extending coaxial with said shaft and partially therearound for assisting in freeing the blanks from the web and delivering same into stacked position.

References Cited in the file of this patent

UNITED STATES PATENTS

| Number | Name | Date |
|---|---|---|
| 538,018 | Ethridge | Apr. 23, 1895 |
| 609,007 | Butler | Aug. 16, 1898 |
| 1,140,889 | Elliott | May 25, 1915 |
| 1,269,673 | Armstrong | June 18, 1918 |
| 1,289,084 | Banzett | Dec. 31, 1918 |
| 1,669,164 | Holman | May 8, 1928 |
| 1,979,985 | Moone | Nov. 6, 1934 |
| 2,087,704 | Potdevin | July 20, 1937 |
| 2,206,186 | Hantjopoulos | July 2, 1940 |
| 2,231,735 | Pittaluga | Feb. 11, 1941 |
| 2,233,357 | Breyer | Feb. 25, 1941 |
| 2,251,221 | Cleven | July 29, 1941 |
| 2,523,153 | Shapiro | Sept. 19, 1950 |
| 2,546,069 | Hart | Mar. 20, 1951 |